US009291519B2

(12) United States Patent
Mannal et al.

(10) Patent No.: US 9,291,519 B2
(45) Date of Patent: Mar. 22, 2016

(54) METHOD FOR CORRECTING AN OFFSET FOR A PRESSURE DIFFERENCE MEASURED USING A DIFFERENTIAL PRESSURE SENSOR SITUATED IN AN AIR DUCT

(71) Applicants: Soenke Mannal, Stuttgart (DE); Berthold Burk, Ingersheim (DE); Horst Mueller, Sachsenheim (DE); Michael Bachner, Stuttgart (DE)

(72) Inventors: Soenke Mannal, Stuttgart (DE); Berthold Burk, Ingersheim (DE); Horst Mueller, Sachsenheim (DE); Michael Bachner, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 290 days.

(21) Appl. No.: 13/936,794

(22) Filed: Jul. 8, 2013

(65) Prior Publication Data

US 2014/0007647 A1 Jan. 9, 2014

(30) Foreign Application Priority Data

Jul. 9, 2012 (DE) ........................ 10 2012 211 900

(51) Int. Cl.

*G01L 27/00* (2006.01)
*F02D 41/00* (2006.01)

(52) U.S. Cl.

CPC ........... *G01L 27/002* (2013.01); *F02D 41/0007* (2013.01); *F02D 2200/0402* (2013.01); *F02D 2200/0406* (2013.01); *F02D 2200/0408* (2013.01); *Y02T 10/121* (2013.01)

(58) Field of Classification Search

None
See application file for complete search history.

(56) References Cited

U.S. PATENT DOCUMENTS

| | | | | |
|---|---|---|---|---|
| 4,817,022 | A * | 3/1989 | Jornod et al. | 702/98 |
| 5,606,117 | A * | 2/1997 | Vogel et al. | 73/114.18 |
| 8,091,535 | B2 | 1/2012 | Nitzke et al. | |
| 2012/0210798 | A1 * | 8/2012 | Shike | 73/716 |

FOREIGN PATENT DOCUMENTS

DE 10 2006 054 043 5/2008

* cited by examiner

*Primary Examiner* — Andre Allen
(74) *Attorney, Agent, or Firm* — Kenyon & Kenyon LLP

(57) ABSTRACT

A method for correcting an offset for a pressure difference measured using a differential pressure sensor situated in an air duct. The offset is computed using an output signal of a pressure sensor, including: transferring the air duct into a predetermined operating situation in which a predetermined pressure difference is considered to be applied to the differential pressure sensor, measuring a level of the output signal in the predetermined operating situation, and computing the offset based on the measured level of the output signal.

26 Claims, 3 Drawing Sheets

95 111 44 34 36 38 40 78 76 74 4 42 28 2 72 70 32 72 66 60 46 48 84 112 114 30 54 50 82 52 56 20 22 60 14 80 86 58 10 12 58 62 16 18 64 68 control device 8 24 6 26 110 control device

METHOD FOR CORRECTING AN OFFSET FOR A PRESSURE DIFFERENCE MEASURED USING A DIFFERENTIAL PRESSURE SENSOR SITUATED IN AN AIR DUCT

CROSS REFERENCE

The present application claims the benefit under 35 U.S.C. §119 of German Patent Application No. DE 102012211900.0 filed on Jul. 9, 2012, which is expressly incorporated herein by reference in its entirety.

FIELD

The present invention relates in general to vehicles, in particular air supply systems having differential pressure sensors. Moreover, the present invention relates to the area of corrections of pressure differences measured using a sensor situated in an air duct.

BACKGROUND INFORMATION

Differential pressure sensors which are installed in internal combustion engines are described in German Patent Application No. DE 10 2006 054 043 A1. Pressures are thermodynamic parameters, and may be used in internal combustion engines for detecting the temperature and/or mass of gases flowing through a fresh air intake system and/or through an exhaust emission system. These parameters are generally used by a control device of the internal combustion engine in order to inject an optimal fuel quantity into a combustion chamber of the internal combustion engine for a certain operating range of the internal combustion engine.

SUMMARY

In accordance with the present invention, an example method for correcting an offset for a pressure difference measured using a differential pressure sensor situated in an air duct is provided, and an example control device and an example vehicle having the control device are provided.

According to a first aspect of an example embodiment of the present invention, an example method for correcting an offset for a pressure difference measured using a differential pressure sensor situated in an air duct is provided, the offset being computed using an output signal of the pressure sensor. The example method includes the following:

- transferring the air duct into a predetermined operating situation in which a predetermined pressure difference is considered to be applied to the differential pressure sensor,
- measuring an output signal value in the predetermined operating situation, and
- computing the offset based on the measured output signal value.

The example method is based on the consideration that the detection of a pressure difference using a differential pressure sensor is generally subject to tolerances in the offset. This means that an error in detecting the pressure difference is always repeated in the same way. To avoid this error, the offset could be determined based on a known pressure difference, for example by detecting an output signal value of the differential pressure sensor for the known pressure difference and determining the distance from a desired output signal value, which should correspond to the known pressure difference.

However, the present invention recognizes that the offset changes over the service life of the differential pressure sensor, for example due to component drifts. In order to take this change in the offset into account in measuring the pressure difference and to ensure that a defined associated output signal value is always obtained for a certain pressure difference, the present invention proposes to calibrate the offset in certain known operating situations. These known operating situations are present in an air duct of an internal combustion engine, for example, when the internal combustion engine is switched off and therefore pressure is no longer built up in the air duct. In that case, it is also not possible to detect a pressure difference between two different points in the air duct which may be used for calibrating the offset.

In one refinement of the example method, for measuring the output signal value, the output signal is detected over a predetermined time period and filtered. The refinement is based on the consideration that during the measurement of the predetermined pressure difference, a single output signal value could be distorted by noise, for example, which would result in an incorrect offset. To attenuate the effects of this type of outlier in the measurement of the predetermined pressure difference, the offset may be computed using output signal values which reflect the predetermined pressure difference at various points in time.

In another refinement of the example method, the offset is computed based on the measured output signal value and an output signal value measured in the past. The computation may be carried out in any arbitrary manner. For example, the new offset could be interpolated based on the conducted measurement and the old offset. In this way, effects of the above-mentioned outliers are attenuated, even when they occur over a comparatively long time period.

In an additional refinement, the example method includes the step of ignoring the computed offset when an interference pressure is detected in the air duct. This refinement is based on the finding that a differential pressure sensor in an air duct of an internal combustion engine may be affected by various interferences. If the interference which influences the functioning of the differential pressure sensor is known, the calibration of the offset at this point in time should be suspended. Within the meaning of the example method, the calibration may be suspended in any arbitrary manner. It is not necessary for the calibration of the offset to also be carried out, and for the offset to be computed. Thus, although the calibration may be carried out and subsequently discarded, under the prerequisite that the interference pressure is detected it is also possible to not allow any calibration of the offset at all.

In one particular refinement of the example method, the air duct is part of a low-pressure exhaust gas recirculation duct in the internal combustion engine.

In one preferred refinement of the example method, the interference pressure is a negative pressure introduced into the air duct by an exhaust gas suction system. This type of interference is only temporary, and may be reliably excluded as an error in the differential pressure sensor, since a suction system of this type is generally connected to the vehicle for test purposes, for example for an exhaust gas emissions test. If the air duct is the low-pressure exhaust gas recirculation duct in the internal combustion engine, the negative pressure introduced by the suction system is applied directly to this low-pressure exhaust gas recirculation duct, so that this negative pressure distorts the differential pressures in the low-pressure exhaust gas recirculation duct, to be measured by the differential pressure sensor, for the time period during the tests using the suction system.

In another refinement of the example method, the interference pressure is applied to a further air duct which branches off from the air duct, the interference pressure being present when the output signal changes with a degree of opening of an air duct which branches off from the air duct. The degree of opening may be changed, for example, by actuators such as valves or flaps which influence a cross section of the air duct. The actuator is particularly preferably an exhaust gas flap situated in an exhaust tract as a further air duct, or a fresh air throttle upstream from a compressor or upstream from a 3-way valve on the exhaust gas or fresh air side. The refinement is based on the consideration that the above-mentioned negative pressure applied to the air duct which branches off from the air duct is independent of the predetermined operating situation. Thus, it does not matter whether the internal combustion engine is running or at a standstill; in any case, if the interference pressure is present, for an interference pressure applied to the further air duct the differential pressure sensor would have to detect a changing differential pressure in the air duct if the degree of opening of the further air duct is changed by the actuator.

The differential pressure may preferably drop via an actuator which influences the degree of opening of the air duct. In this case, the actuator may be a valve or a flap.

The dependency of the output signal on the degree of opening of the air duct which branches off from the air duct is particularly preferably tested with at least two degrees of opening of the air duct via the pressure difference to be measured, of completely open and completely closed. Similarly, even for a completely open air duct it would not be possible for any pressures to build up in the air duct. The air duct should therefore be slightly closed, but still open.

In another refinement, the predetermined operating situation in which the predetermined pressure difference is considered to be applied to the differential pressure sensor is present when the air duct is free of mass flow. Thus, no other pressures are built up in the air duct, so that the predetermined pressure difference may be assumed to be zero. This predetermined pressure difference of zero may then be changed only by the interference pressure of zero.

In one particular refinement, the air duct is considered to be free of mass flow when a speed of the internal combustion engine is zero. In this way the predetermined operating situation may be detected without further sensor measures.

In one particularly preferred refinement, the speed of the internal combustion engine is considered to be zero when the internal combustion engine is at a standstill for a predetermined time period. A steady state of the internal combustion engine may thus be assumed in which it is also ensured that no residual gases are moved via the air duct from a combustion chamber of the internal combustion engine.

According to another aspect of the present invention, a device, in particular an arithmetic unit, for correcting an offset for a pressure difference measured using a differential pressure sensor situated in an air duct is provided, the offset being computed using an output signal of a pressure sensor, the device being designed

- to transfer the air duct into a predetermined operating situation in which a predetermined pressure difference is considered to be applied to the differential pressure sensor,
- to measure a level of the output signal in the predetermined operating situation, and
- to compute the offset based on the measured level of the output signal.

In one refinement of the present invention, the example device has a memory and a processor. The example method is stored in the memory in the form of a computer program, and the processor is provided for executing the example method when the computer program is loaded from the memory into the processor.

According to another aspect of the present invention, a vehicle includes the example device.

Moreover, the present invention relates to an example computer program having program code in order to carry out all steps of one of the example methods when the computer program is executed on a computer or on one of the stated devices.

Moreover, the present invention relates to a computer program product which contains a program code that is stored on a computer-readable data carrier and which carries out one of the stated methods when the program code is executed on a data processing unit.

BRIEF DESCRIPTION OF THE DRAWINGS

Preferred specific embodiments of the present invention are explained in greater detail below with reference to the figures.

DETAILED DESCRIPTION OF EXAMPLE EMBODIMENTS

Figure 1:
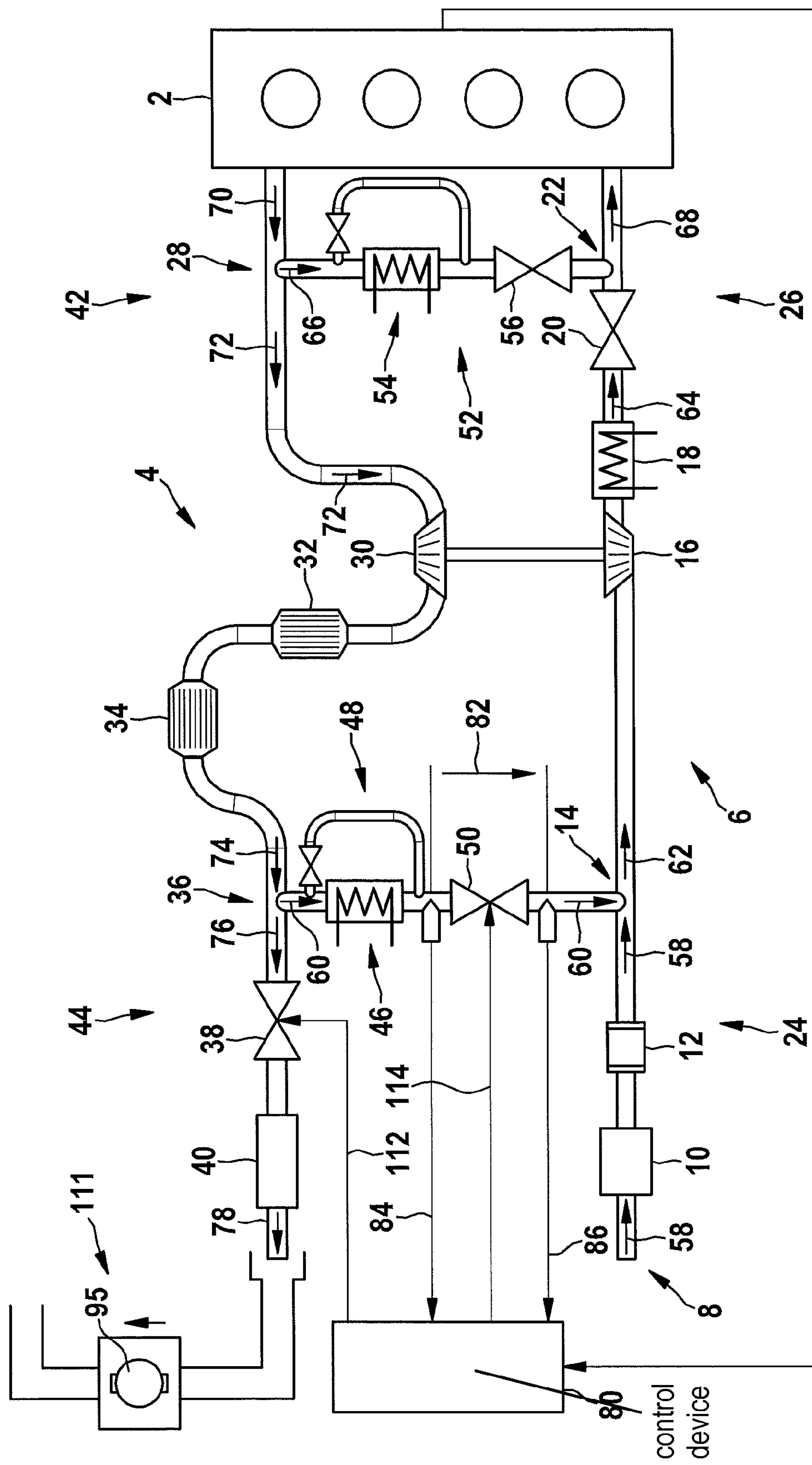
FIG. 1 shows a schematic illustration of an internal combustion engine that is supplied with fresh air via a fresh air intake system and which discharges combusted exhaust gas via an exhaust emission system.

Elements having an identical or comparable function are provided with the same reference numerals in the figures, and are described only once.

FIG. 1 shows an internal combustion engine 2 having an exhaust emission system 4 and a fresh air intake system 6 for supplying fresh air to internal combustion engine 2. Viewed from left to right in the figure, fresh air intake system 6 includes an air inlet 8, an air filter 10, a hot film air mass meter 12, a branch 14, a compressor 16, a cooler 18, a valve 20, and a branch 22. An air path from air inlet 8 to compressor 16 denotes a first section 24 in which the fresh air has a comparatively low pressure, and an air path from compressor 16 to internal combustion engine 2 denotes a second section 26 in which the fresh air has a comparatively high pressure.

Viewed from right to left in the drawing, exhaust emission system 4 in the top area of FIG. 1 contains a branch 28, an exhaust gas turbine 30, an oxidation catalytic converter 32, a particle filter 34, a branch 36, an exhaust gas flap 38, and a muffler 40. An exhaust gas path from internal combustion engine 2 to exhaust gas turbine 30 denotes a section 42 in which an exhaust gas has a comparatively high pressure, and an exhaust gas path from exhaust gas turbine 30 to muffler 40 denotes a section 44 in which an exhaust gas has a comparatively low pressure. It is understood that the pressure of the exhaust gas along section 44 may also be reduced in a stepwise manner via exhaust gas turbine 30, oxidation catalytic converter 32, and particle filter 34, corresponding to the flow resistances which occur in these elements.

A low-pressure exhaust gas recirculation system 46 is present in the left area of FIG. 1, between branch 36 of exhaust emission system 4 and branch 14 of fresh air intake system 6. Low-pressure exhaust gas recirculation system 46 includes a device 48 and a low-pressure exhaust gas recirculation valve 50.

A high-pressure exhaust gas recirculation system 52 is present in the right area of FIG. 1, between branch 28 of exhaust emission system 4 and branch 22 of fresh air intake system 6. High-pressure exhaust gas recirculation system 52 includes a device 54 and a high-pressure exhaust gas recirculation valve 56. In the present case, devices 48 and 52 each include an exhaust gas recirculation cooler having a bypass and a valve (not explained in greater detail).

During operation of internal combustion engine 2, low-pressure fresh air 58 which is enriched at branch 14 with recirculated low-pressure exhaust gas 60 via low-pressure exhaust gas recirculation system 46 flows through air filter 10 and hot film air mass meter 12. Enriched low-pressure fresh air 62 is compressed in compressor 16. Compressed enriched low-pressure fresh air 64 is enriched in section 22 with recirculated high-pressure exhaust gas 66 and supplied to internal combustion engine 2 as high-pressure fresh air 68 for combustion of a fuel.

As a result of the combustion, internal combustion engine 2 discharges high-pressure exhaust gas 70, from which recirculated exhaust gas 66 is picked up in section 28. The quantity of recirculated exhaust gas 66 is adjusted via high-pressure exhaust gas recirculation valve 56. Remainder 72 of high-pressure exhaust gas 70 is expanded in exhaust gas turbine 30 to form low-pressure exhaust gas 74. Recirculated low-pressure exhaust gas 60 is picked up by low-pressure exhaust gas 74 in section 36, while remainder 76 of low-pressure exhaust gas 74 is discharged via an exhaust pipe 78.

In the present design, a control device 80 is connected to exhaust emission system 4 and fresh air intake system 6 at internal combustion engine 2. Control device 80 may be part of a conventional engine control system, which controls the combustion in internal combustion engine 2. However, control device 80 may also be an additional diagnostic device which carries out functionality diagnostics on the components of internal combustion engine 2 having exhaust emission system 4 and fresh air intake system 6.

Control device 80 may be provided, for example, for detecting a pressure difference 82 which prevails over low-pressure exhaust gas recirculation valve 50. Control device 80 is thus used as a measuring device. This occurs by the detection of a pressure 84 of recirculated low-pressure exhaust gas 60 upstream from low-pressure exhaust gas recirculation valve 50 and a pressure 86 of recirculated low-pressure exhaust gas 60 downstream from low-pressure exhaust gas recirculation valve 50. The two detected pressures are subtracted from one another in control device 80, resulting in pressure difference 82 to be detected.

Figure 2:
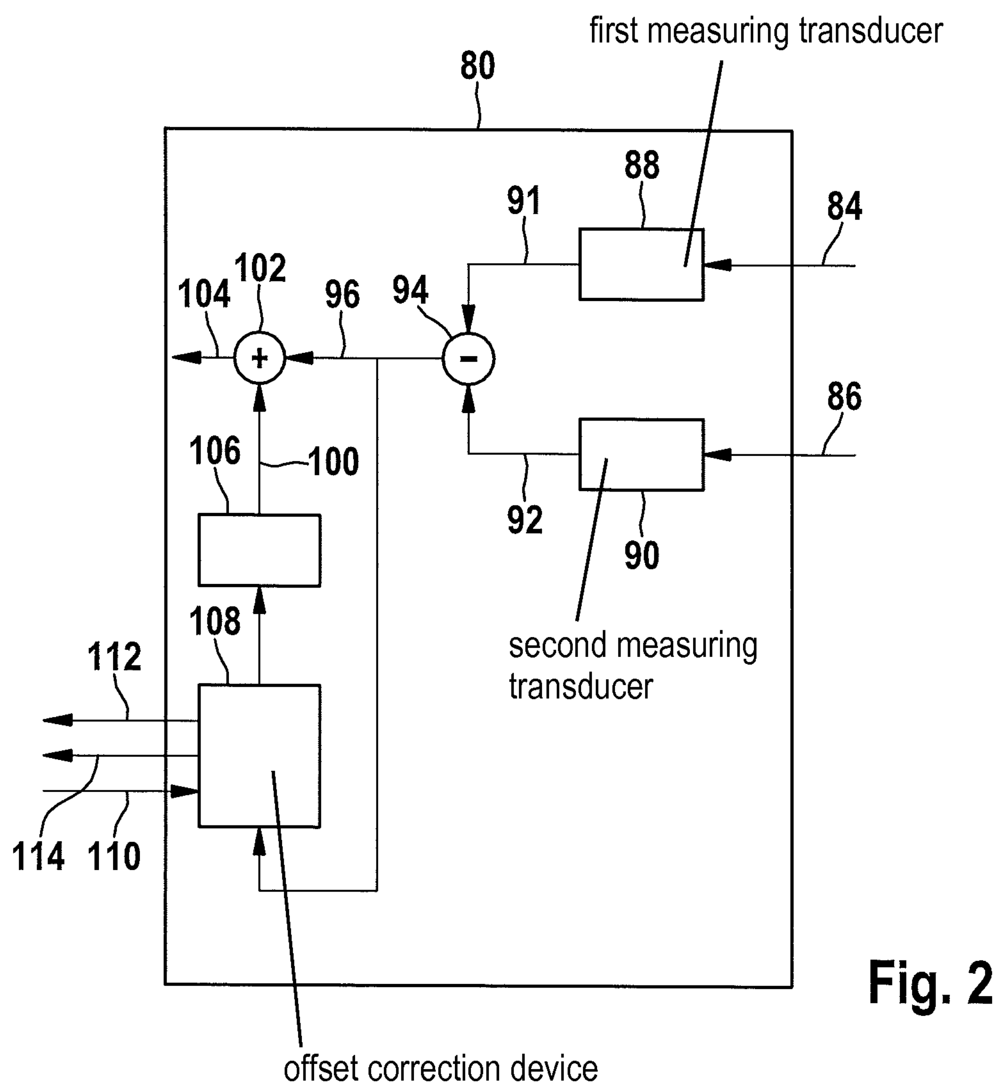
FIG. 2 shows a schematic illustration of part of a control device via which a pressure difference may be computed.

Reference is made to FIG. 2, which shows a schematic illustration of part of control device 80 via which pressure difference 82 may be computed.

In the present design, control device 80 includes a first measuring transducer 88 for converting pressure 84 of recirculated low-pressure exhaust gas 60 upstream from low-pressure exhaust gas recirculation valve 50, and a second measuring transducer 90 for converting pressure 86 of recirculated low-pressure exhaust gas 60 downstream from low-pressure exhaust gas recirculation valve 50. The two measuring transducers correspondingly output a first electrical measuring signal 91 and a second measuring signal 92, which are then subtracted from one another in a subtraction element 94. The result of this subtraction is an unadjusted electrical measuring signal 96 for differential pressure 82. It is noted at this point that electrical measuring signal 96 for differential pressure 82 may also be output by a pressure sensor itself.

Unadjusted electrical measuring signal 96 for differential pressure 82 is subject to tolerances due to component tolerances, measuring fluctuations, and other influences. However, it has been shown that these tolerances generally correspond to an offset 100 which is independent of a level of unadjusted electrical measuring signal 96 for differential pressure 82. Therefore, unadjusted electrical measuring signal 96 for differential pressure 82 may be adjusted by offset 100 in an addition element 102, resulting in an adjusted electrical measuring signal 104 for differential pressure 82.

Offset 100 may, for example, be stored in a memory 106 and read out from the memory as needed. Since the tolerances in unadjusted electrical measuring signal 96 may change over a fairly long time period due to component drifts, for example, in the present design of control device 80 an offset correction device 108 is present which may correct offset 100 stored in the memory.

Offset correction device 108 carries out the correction of offset 100 in a certain operating state of internal combustion engine 2. This certain operating state is preferably the standstill of internal combustion engine 2, when internal combustion engine 2 is switched off. For this purpose, offset correction device 108 receives actual state 110 of internal combustion engine 2 and checks whether this state corresponds to the certain operating state. The recognition of whether actual state 110 corresponds to the certain state will be addressed below, based on a check of whether internal combustion engine 2 is at a standstill and switched off.

If internal combustion engine 2 is in the certain operating state, offset correction device 108 also knows the pressure conditions in low-pressure exhaust gas recirculation system 46. If internal combustion engine 2 is at a standstill, for example, no fresh air is drawn in and also no exhaust gas is discharged, so that no differential pressures may arise. In this case, differential pressure 82 to be measured may be considered to be zero. If differential pressure 82 is zero, a certain level for adjusted measuring signal 104 for differential pressure 82 may be defined. A difference between the defined certain level and a level which results at unadjusted measuring signal 96 for differential pressure 82 may then be defined as adjusted offset 100. A detailed method for offset correction 100 will be addressed below.

The offset correction may be prohibited if interfering pressures prevail in low-pressure exhaust gas recirculation system 46. FIG. 1 illustrates a situation in which internal combustion engine 2 is connected to an exhaust gas suction system 111. This exhaust gas suction system 111 draws remainder 76 of low-pressure exhaust gas 74 from exhaust pipe 78 with the aid of a suction motor 95, and thus introduces a pressure into exhaust emission system 4 which distorts the measurement of differential pressure 82. To prevent the above-mentioned check of whether the detected differential pressure corresponds to the expected differential pressure from resulting in an unintended offset ascertainment, it is proposed in the present embodiment to discard any results of the check, or to not carry out the check at all. To determine whether an exhaust gas suction system 111 is connected to exhaust emission system 4, in the present embodiment it is proposed to observe a variation of differential pressure 82 over time when various actuators in the exhaust emission system are activated. For this purpose, offset correction device 108 may control and adjust exhaust gas flap 38 via a first control signal 112, and control and adjust low-pressure exhaust gas recirculation valve 50 via a second control signal 114.

Control device 80 initially ensures via second control signal 114 for low-pressure exhaust gas recirculation valve 50 that differential pressure 82 may also drop at that location. If low-pressure exhaust gas recirculation valve 50 is open, differential pressure 82 cannot be built up, for which reason an at least partially closed position of low-pressure exhaust gas recirculation valve 50 should be selected.

Control device 80 subsequently varies exhaust gas flap 38 via first control signal 112. By varying exhaust gas flap 38, with internal combustion engine 2 at a standstill as the above-mentioned operating state, no change in pressure difference 82 could be shown, since no pressures may be built up in low-pressure exhaust gas recirculation system 46. In contrast, these pressures are introduced into low-pressure exhaust gas recirculation system 46 by exhaust gas suction system 111, for which reason the differential pressure changes even when exhaust gas flap 38 varies. In this case, functionality tests for detecting the differential pressure should be discarded or not carried out.

Figure 3:
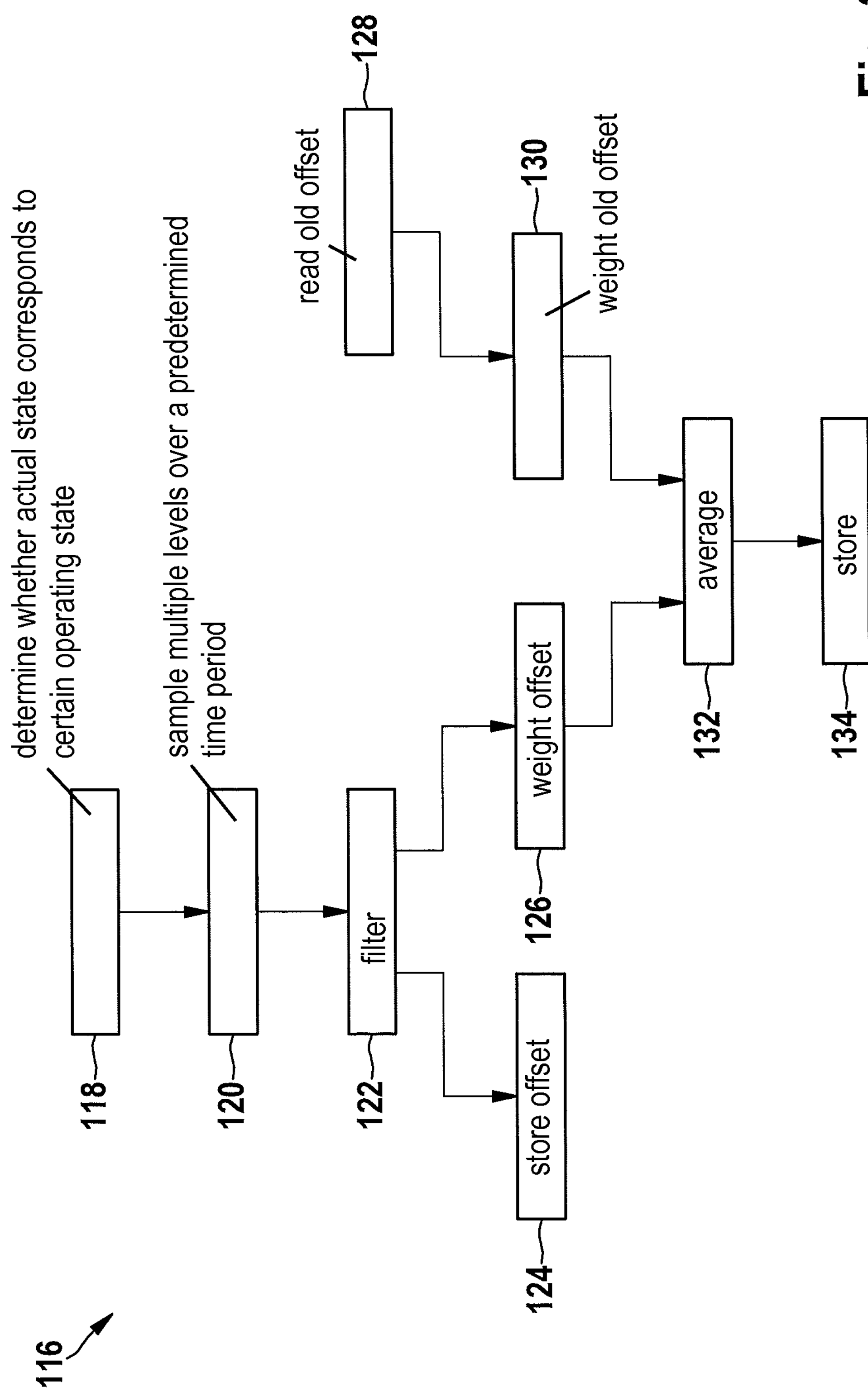
FIG. 3 shows a flow chart of one exemplary embodiment of a stated method.

Reference is made to FIG. 3, which shows a flow chart of one exemplary embodiment of a stated method 116.

In method 116, it is initially determined in step 118 whether the actual state of internal combustion engine 2 corresponds to the certain operating state. As previously mentioned, this should be the case when internal combustion engine 2 is at a standstill. For this purpose, the speed of internal combustion engine 2 may be detected, and if this speed is equal to zero for a predetermined time period, it may be assumed that internal combustion engine 2 has stopped running and come to a standstill.

After the standstill of internal combustion engine 2 has been recognized, multiple levels of unadjusted electrical measuring signal 96 for differential pressure 82 may be sampled over a predetermined time period in step 120. Since differential pressure 82 must not change when internal combustion engine 2 is at a standstill, the individual levels have to be equal among one another.

Thus, in order to filter interferences from noise and other negative influences on unadjusted electrical measuring signal 96, the individual levels of unadjusted electrical measuring signal 96 for differential pressure 82 may be filtered in step 122 by averaging, for example, so that an actual level is established with which a differential pressure 82 of zero may be associated. However, if differential pressure 82 of zero is to be output at a certain setpoint level, the actual level must be adjusted by an offset 100 which raises the actual level to the setpoint level. Corresponding offset 100 may be determined, for example, by subtracting the actual level and the setpoint level from one another.

Offset 100 determined in this way could be stored in memory 106 in step 124.

Alternatively, offset 100 determined in this way could be weighted with a weighting factor in step 126.

Old offset 100 could be read out from the memory in step 128, and weighted with an additional weighting factor in step 130.

The two weighted offsets 100 could then be averaged in step 132, it being possible to store the new offset resulting from the averaging in memory 106 as a new offset 100.

What is claimed is:

1. A method for correcting an offset for a pressure difference measured using a differential pressure sensor situated in an air duct, the offset being computed using an output signal of a pressure sensor, the method comprising:

transferring the air duct into a predetermined operating situation in which a predetermined pressure difference is considered to be applied to the differential pressure sensor;

measuring, in the predetermined operating situation, a level of the output signal; and computing the offset based on the measured level of the output signal.

2. The method as recited in claim 1, wherein for measuring the level of the output signal, the output signal is detected over a predetermined time period and filtered.

3. The method as recited in claim 1, wherein the offset is computed based on the measured level of the output signal and a level of the output signal value measured in the past.

4. The method as recited in claim 1, further comprising:

ignoring the computed offset when an interference pressure is detected in the air duct.

5. The method as recited in claim 1, wherein the interference pressure is a negative pressure introduced into the air duct by an exhaust gas suction system.

6. The method as recited in claim 1, wherein the interference pressure is present when the output signal changes with a degree of opening of an air duct which branches off from the air duct.

7. The method as recited in claim 6, wherein a dependency of the output signal on the degree of opening of the air duct which branches off from the air duct is tested with a degree of opening of the air duct of less than completely open and more than completely closed.

8. The method as recited in claim 1, wherein the predetermined operating situation in which a pressure difference at the differential pressure sensor is considered to be zero is present when the air duct is free of mass flow.

9. A device for correcting an offset for a pressure difference measured using a differential pressure sensor situated in an air duct, comprising:

a determining arrangement to determine the offset using an output signal of a pressure sensor;

a transfer arrangement to transfer the air duct into a predetermined operating situation in which a predetermined pressure difference is considered to be applied to the differential pressure sensor, to measure a level of the output signal in the predetermined operating situation, wherein the offset is determined based on the measured level of the output signal;

wherein the pressure difference is measured using a first measuring transducer for converting a pressure of recirculated low-pressure exhaust gas upstream from a low-pressure exhaust gas recirculation valve, and a second measuring transducer for converting a pressure of recirculated low-pressure exhaust gas downstream from a low-pressure exhaust gas recirculation valve.

10. A vehicle, comprising:

a control device for correcting an offset for a pressure difference measured using a differential pressure sensor situated in an air duct, including:

a determining arrangement to determine the offset using an output signal of a pressure sensor;

a transfer arrangement to transfer the air duct into a predetermined operating situation in which a predetermined pressure difference is considered to be applied to the differential pressure sensor, to measure a level of the output signal in the predetermined operating situation, wherein the offset is determined based on the measured level of the output signal;

wherein the pressure difference is measured using a first measuring transducer for converting a pressure of recirculated low-pressure exhaust gas upstream from a low-pressure exhaust gas recirculation valve, and a second measuring transducer for converting a pressure of recirculated low-pressure exhaust gas downstream from a low-pressure exhaust gas recirculation valve.

11. A non-transitory computer-readable storage medium storing a computer program having program code to correct an offset for a pressure difference measured using a differential pressure sensor situated in an air duct, the offset being computed using an output signal of a pressure sensor, the program code, when executed by a computer, causing the computer to perform:

transferring the air duct into a predetermined operating situation in which a predetermined pressure difference is considered to be applied to the differential pressure sensor;

measuring, in the predetermined operating situation, a level of the output signal; and computing the offset based on the measured level of the output signal.

12. A non-transitory computer-readable data carrier storing a computer program having program code to correct an offset for a pressure difference measured using a differential pressure sensor situated in an air duct, the offset being computed using an output signal of a pressure sensor, the program code, when executed by a computer, causing the computer to perform:

transferring the air duct into a predetermined operating situation in which a predetermined pressure difference is considered to be applied to the differential pressure sensor;

measuring, in the predetermined operating situation, a level of the output signal; and computing the offset based on the measured level of the output signal.

13. The computer-readable data carrier as recited in claim 12, wherein for measuring the level of the output signal, the output signal is detected over a predetermined time period and filtered.

14. The computer-readable data carrier as recited in claim 12, wherein the offset is computed based on the measured level of the output signal and a level of the output signal value measured in the past.

15. The computer-readable data carrier as recited in claim 12, wherein the computed offset is ignored when an interference pressure is detected in the air duct.

16. The computer-readable data carrier as recited in claim 12, wherein the interference pressure is a negative pressure introduced into the air duct by an exhaust gas suction system.

17. The computer-readable data carrier as recited in claim 12, wherein the interference pressure is present when the output signal changes with a degree of opening of an air duct which branches off from the air duct.

18. The computer-readable data carrier as recited in claim 17, wherein a dependency of the output signal on the degree of opening of the air duct which branches off from the air duct is tested with a degree of opening of the air duct of less than completely open and more than completely closed.

19. The computer-readable data carrier as recited in claim 12, wherein the predetermined operating situation in which a pressure difference at the differential pressure sensor is considered to be zero is present when the air duct is free of mass flow.

20. The computer-readable storage medium as recited in claim 11, wherein for measuring the level of the output signal, the output signal is detected over a predetermined time period and filtered.

21. The computer-readable storage medium as recited in claim 11, wherein the offset is computed based on the measured level of the output signal and a level of the output signal value measured in the past.

22. The computer-readable storage medium as recited in claim 11, wherein the computed offset is ignored when an interference pressure is detected in the air duct.

23. The computer-readable storage medium as recited in claim 11, wherein the interference pressure is a negative pressure introduced into the air duct by an exhaust gas suction system.

24. The computer-readable storage medium as recited in claim 11, wherein the interference pressure is present when the output signal changes with a degree of opening of an air duct which branches off from the air duct.

25. The computer-readable storage medium as recited in claim 24, wherein a dependency of the output signal on the degree of opening of the air duct which branches off from the air duct is tested with a degree of opening of the air duct of less than completely open and more than completely closed.

26. The computer-readable storage medium as recited in claim 11, wherein the predetermined operating situation in which a pressure difference at the differential pressure sensor is considered to be zero is present when the air duct is free of mass flow.

* * * * *